United States Patent
Joseph et al.

(10) Patent No.: US 10,055,504 B2
(45) Date of Patent: Aug. 21, 2018

(54) AGGREGATION OF TRAFFIC IMPACT METRICS

(71) Applicant: International Business Machines Corporation, Armonk, NY (US)

(72) Inventors: Alex J. Joseph, Bangalore (IN); Raghunath E. Nair, Bangalore (IN); Panibhushan Shivaprasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 14/682,278

(22) Filed: Apr. 9, 2015

(65) Prior Publication Data

US 2016/0300140 A1  Oct. 13, 2016

(51) Int. Cl.
*G06F 7/02* (2006.01)
*G06F 17/30* (2006.01)
*G08G 1/01* (2006.01)

(52) U.S. Cl.
CPC .. *G06F 17/30876* (2013.01); *G06F 17/30241* (2013.01); *G06F 17/30601* (2013.01); *G08G 1/0104* (2013.01); *G08G 1/0129* (2013.01)

(58) Field of Classification Search
None
See application file for complete search history.

(56) References Cited

U.S. PATENT DOCUMENTS

| | | | |
|---|---|---|---|
| 5,539,645 A | * | 7/1996 | Mandhyan ........... G08G 1/0104 340/905 |
| 7,558,865 B2 | | 7/2009 | Lin et al. |
| 7,577,513 B2 | | 8/2009 | Kumagai et al. |
| 8,483,940 B2 | | 7/2013 | Chapman et al. |
| 8,700,294 B2 | | 4/2014 | Downs et al. |
| 2006/0122846 A1 | * | 6/2006 | Burr ................... G01C 21/3492 342/357.31 |

(Continued)

FOREIGN PATENT DOCUMENTS

CN  103297623 A  9/2013

OTHER PUBLICATIONS

Chatterjee et al., "Travel Demand Forecasting for Urban Transportation Planning", provided by inventor on Jun. 12, 2014, <http://mason.gmu.edu/~mvenigal/CEIE462562/Book_Chapter_by_Chatterjee_and_Venigalla.pdf>.

(Continued)

*Primary Examiner* — Bruce M Moser
(74) *Attorney, Agent, or Firm* — Isaac J. Gooshaw; David M. Quinn (57) ABSTRACT

Aggregation of traffic impact metrics is provided. Each of a plurality of holidays is associated with a holiday category of a plurality of holiday categories. The plurality of holiday categories includes a first holiday category and a second holiday category. A plurality of points of interest along a link of a transportation network is identified. At least one of the plurality of points of interest is associated with the first holiday category and at least one of the plurality of points of interest with the second holiday category. A mean category impact for each of the plurality of holiday categories is determined. An aggregated traffic impact metric is determined based, at least in part, on the mean category impact of each of the plurality of holiday categories.

20 Claims, 3 Drawing Sheets

(56) References Cited

U.S. PATENT DOCUMENTS

| | | | |
|---|---|---|---|
| 2007/0299599 A1* | 12/2007 | Letchner | G01C 21/3484 701/424 |
| 2009/0002195 A1* | 1/2009 | Horvitz | G08G 1/0104 340/934 |
| 2009/0082948 A1* | 3/2009 | Hiruta | G08G 1/0104 701/117 |
| 2011/0077855 A1* | 3/2011 | Sumizawa | G08G 1/096888 701/533 |
| 2011/0224893 A1* | 9/2011 | Scofield | G01C 21/3492 701/119 |
| 2014/0358414 A1* | 12/2014 | Ibrahim | G01C 21/10 701/118 |

OTHER PUBLICATIONS

Mei et al., "Short Term Traffic Volume Prediction for Sustainable Transportation in Urban Area", Journal of Computing in Civil Engineering. Submitted Oct. 11, 2012; accepted Apr. 17, 2013, posted ahead of print Apr. 19, 2013, doi:10.1061/(ASCE)CP.1943-5487.0000316, Copyright 2013 by the American Society of Civil Engineers, <http://www.eecs.qmul.ac.uk/~athen/Site/Publications_files/%2528asce%2529cp%252E1943-5487%252E0000316.pdf>.

Min et al., "Road Traffic Prediction with Spatio-Temporal Correlations", RC24275 (W0706-018) Jun. 5,2007, <http://domino.watson.ibm.com/library/cyberdig.nsf/papers/80B6905971EDA9E5852572F900560F2F/$File/rc24275.pdf>.

Nookala, Lalit Sivanandan, "Weather Impact on Traffic Conditions and Travel Time Prediction", Oct. 2006, Submitted in partial fulfillment of the Requirements for the degree of Master of Science, Department of Computer Science, University of Minnesota Duluth, USA, <http://www.d.umn.edu/cs/thesis/lalit_nookala_ms.pdf>.

Ratanaparadorn et al., "Identification of Traffic Prediction Parameters", Management Knowledge and Learning International Conference 2013, Jun. 19-21, 2013, Zadar, Croatia, <http://www.toknowpress.net/ISBN/978-961-6914-02-4/papers/ML13-999.pdf>.

Weijermars, Wendy, "Analysis of urban traffic patterns using clustering", Copyright © 2007 by W.A.M. Weijermars, Enschede, The Netherlands, ISBN 978-90-365-2465-0, <http://doc.utwente.nl/57837/1/thesis_Weijermars.pdf>.

"IBM Intelligent Transportation 1.0.1 documentation", © Copyright IBM Corporation 2011, 2012, <http://pic.dhe.ibm.com/infocenter/cities/v1r0m0/index.jsp?topic=%2Fcom.ibm.iitm.doc%2Finstall_tmddshp.html>.

"Place Search", Google Places API, Last updated Nov. 18, 2014, <https://developers.google.com/places/documentation/search>.

"Traffic and Transport Issues", Coffs Harbour Highway Planning—Sapphire to Woolgoolga Draft Route Options Development Report, Dec. 2002, p. 24-33, <http://web.archive.org/web/20140625121932/http://www.rms.nsw.gov.au/roadprojects/projects/pac_hwy/coffs_harbour_ballina/sapphire_woolgoolga/documents/drodr/section05.pdf>.

* cited by examiner

AGGREGATION OF TRAFFIC IMPACT METRICS

TECHNICAL FIELD

The present invention relates generally to the field of traffic prediction and, more particularly, to aggregation of traffic impact metrics.

BACKGROUND OF THE INVENTION

Traffic prediction is a field in which patterns within a transportation network are estimated and predicted. Traffic prediction includes, for example, predicting the traffic speed in the future on a road segment based on the current and historical speeds on that road segment. Such predictions may be used, for example, by a locality in order to plan for or manage congestion or for overall traffic control. Accurate traffic predictions have the potential to improve traffic conditions, reduce travel delays, and make roadways more efficient. The traffic data is typically gathered using traffic sensors, embedded in a road, that are capable of measuring traffic flow for many road segments, or links, in a transportation network. This traffic prediction system is typically used by a city traffic IT administrators, transportation companies, city planners and city officials who need executive dashboards to better organize the traffic system in discussion.

SUMMARY

According to one embodiment of the present invention, a method for aggregation of traffic impact metrics is provided. The method includes associating, by one or more processors, each of a plurality of holidays with a holiday category of a plurality of holiday categories, wherein the plurality of holiday categories includes a first holiday category and a second holiday category; identifying, by one or more processors, a plurality of points of interest along a link of a transportation network; associating, by one or more processors, at least one of the plurality of points of interest with the first holiday category and at least one of the plurality of points of interest with the second holiday category; determining, by one or more processors, a mean category impact for each of the plurality of holiday categories; and determining, by one or more processors, an aggregated traffic impact metric based, at least in part, on the mean category impact of each of the plurality of holiday categories.

According to another embodiment of the present invention, a computer program product for aggregation of traffic impact metrics is provided. The computer program product comprises a computer readable storage medium and program instructions stored on the computer readable storage medium. The program instructions include program instructions to associate each of a plurality of holidays with a holiday category of a plurality of holiday categories, wherein the plurality of holiday categories includes a first holiday category and a second holiday category; program instructions to identify a plurality of points of interest along a link of a transportation network; program instructions to associate at least one of the plurality of points of interest with the first holiday category and at least one of the plurality of points of interest with the second holiday category; program instructions to determine a mean category impact for each of the plurality of holiday categories; and program instructions to determine an aggregated traffic impact metric based, at least in part, on the mean category impact of each of the plurality of holiday categories.

According to another embodiment of the present invention, a computer system for aggregation of traffic impact metrics is provided. The computer system includes one or more computer processors, one or more computer readable storage media, and program instructions stored on the computer readable storage media for execution by at least one of the one or more processors. The program instructions include program instructions to associate each of a plurality of holidays with a holiday category of a plurality of holiday categories, wherein the plurality of holiday categories includes a first holiday category and a second holiday category; program instructions to identify a plurality of points of interest along a link of a transportation network; program instructions to associate at least one of the plurality of points of interest with the first holiday category and at least one of the plurality of points of interest with the second holiday category; program instructions to determine a mean category impact for each of the plurality of holiday categories; and program instructions to determine an aggregated traffic impact metric based, at least in part, on the mean category impact of each of the plurality of holiday categories.

DETAILED DESCRIPTION

Embodiments of the present invention recognize that traffic prediction algorithms can predict the traffic speed and volume for links in a travel network. Such a prediction may be based on a historic mean, relationships between the link and adjacent links, and a data feed of current traffic speeds and volumes. Embodiments further recognize, however, that such prediction algorithms do not account for the impact of more than one holiday category on a single day. A holiday category represents a group of days (e.g., holidays) with similar historical traffic patterns.

Embodiments of the present invention provide for traffic prediction based, at least in part, on the impact of holidays using, for example, historic data patterns of the holidays. In some embodiments, an administrator configures one or more categories of holidays, each of which includes a set of dates of holidays belonging to the category. Such categories may be dependent on locality or region. For example, a category for public holidays for the United States includes Independence Day on July $4^{th}$. Embodiments of the present invention provide for determining traffic impact metrics based on the impact of multiple coinciding holiday categories.

Embodiments of the present invention provide for determining aggregated traffic impact metrics for the entire transportation network and for particular links of the transportation network.

Embodiments of the present invention provide for determining aggregated traffic impact metrics based, at least in part, on a density of places-of-interest (POI). Examples of POI include, without limitation, particular venues, parade grounds, schools, shopping centers or malls, and religious centers. Each POI has a location (e.g., GPS coordinates or a street address).

Figure 1:
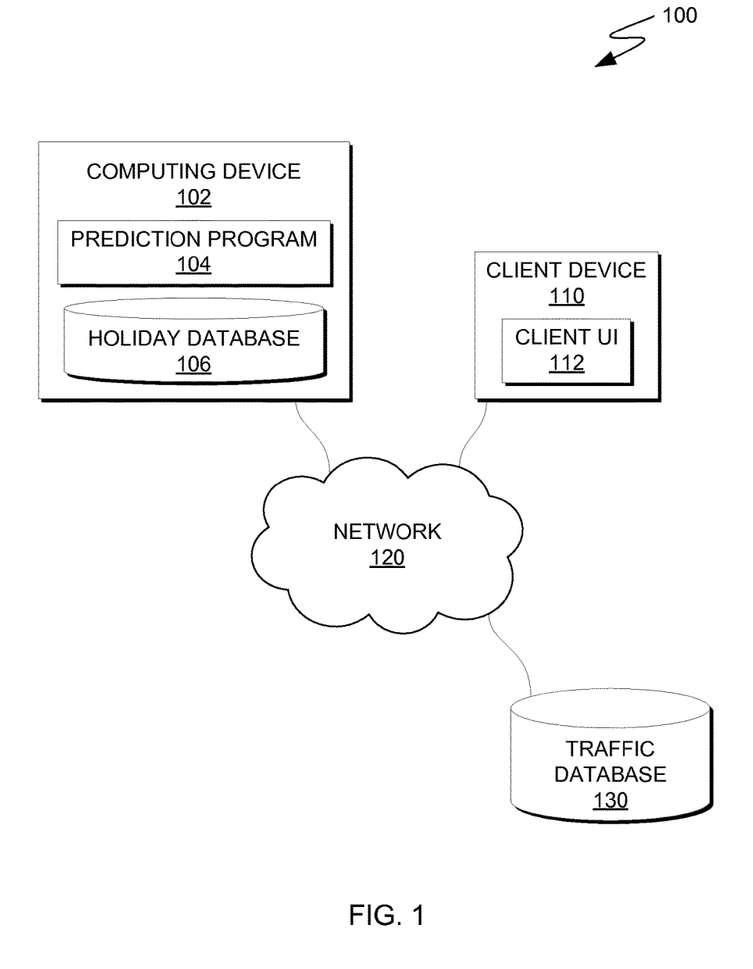
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102, client device 110, and traffic database 130 connected over network 120. Computing device 102 includes prediction program 104 and holiday database 106. Client device 110 includes a user interface (UI), client UI 112.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to and/or capable of executing prediction program 104 and holiday database 106 and with access to client UI 112 and traffic database 130. Computing device 102 may include internal and external hardware components, as depicted and described in further detail with respect to FIG. 3.

In various embodiments, client device 110 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with computing device 102 via network 120. In another embodiment, client device 110 represents a computing system utilizing clustered computers and components to act as a single pool of seamless resources. In general, client device 110 can be any computing device or a combination of devices with access to computing device 102, and with access to and/or capable of executing some or all of client UI 112. Client device 110 may include internal and external hardware components, as depicted and described in further detail with respect to FIG. 3.

In this exemplary embodiment, prediction program 104 and holiday database 106 are stored on computing device 102, and client UI 112 is stored on client device 110. In other embodiments, one or more of prediction program 104, holiday database 106, and client UI 112 may reside on another computing device, provided that each can access the other and that prediction program 104 can access and is accessible by traffic database 130. In yet other embodiments, one or more of prediction program 104, holiday database 106, and client UI 112 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102, client device 110, and traffic database 130, in accordance with a desired embodiment of the present invention.

Prediction program 104 operates to aggregate traffic impact metrics. In one embodiment, prediction program 104 aggregates multiple traffic impact metrics to determine a single, weighted, aggregated traffic impact metric. For example, prediction program 104 determines the aggregated traffic impact metric for a link of a transportation network based on a weekday traffic metric and one or more holiday category traffic metric. In this case, each holiday category traffic metric corresponds to a category of holidays.

Client UI 112 operates to provide a UI to a user of client device 110. Client UI 112 further operates to receive user input from a user via the provided user interface, thereby enabling the user to interact with client device 110. In one embodiment, client UI 112 provides a user interface that enables a user of client device 110 to interact with one or both of prediction program 104 and holiday database 106 of computing device 102 via network 120. In various examples, the user interacts with holiday database 106 in order to populate holiday database 106 with holiday data or POI data, or the user interacts with prediction program 104 in order to view traffic impact metrics or aggregated traffic impact metrics. In one embodiment, client UI 112 is stored on client device 110. In other embodiments, client UI 112 is stored on another computing device (e.g., computing device 102), provided that client UI 112 can access and is accessible by at least prediction program 104 and holiday database 106.

Traffic database 130 is a data repository that may be written to and read by prediction program 104. Traffic data may be stored to traffic database 130. Traffic data includes some or all of historic traffic data and node data. In some embodiments, traffic database 130 may be written to and read by programs and entities outside of computing environment 100 in order to populate the repository with traffic data. In one embodiment, node data includes starting and ending nodes for one or more links of a transportation network. Each starting node and ending node may be represented by location information, such as, for example, GPS coordinates. A link is a portion of the transportation network spanning a path of travel (e.g., a road) between the starting node and the ending node. In various embodiments, historic traffic data includes historic traffic volumes, historic traffic speed information, or a combination thereof. Such historic traffic data corresponds to each link of the transportation network and to each of one or more historic dates. In some embodiments, such historic traffic data corresponds to one or more time points of each historic date.

Holiday database 106 is a data repository that may be written to and read by one or both of prediction program 104 and client UI 112. Holiday data and POI data may be stored to holiday database 106. Holiday data includes data for each of a plurality of holidays, including a historical dates of the holiday, future dates of the holiday, and a category to which the holiday belongs. POI data includes a data for each of a plurality of POI, including a location (e.g., global positioning system (GPS) coordinates, a street address, or a position along a link of a transportation network) of the POI and a category to which the POI belongs. In some embodiments, holiday database 106 may be written to and read by programs and entities outside of computing environment 100 in order to populate the repository with one or both of holiday data and POI data.

Figure 2:
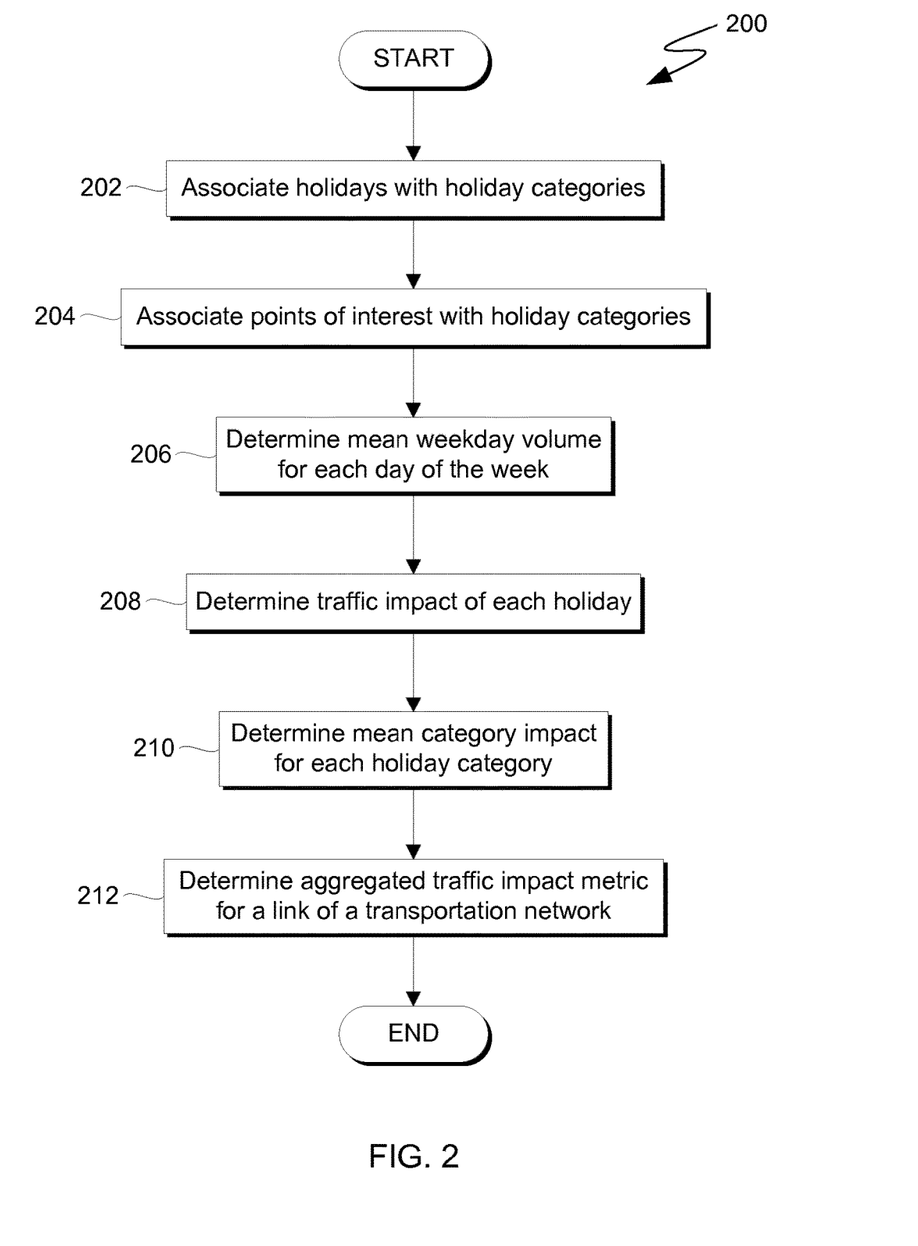
FIG. 2 is a flowchart depicting operations for aggregation of traffic impact metrics, on a computing device within the computing environment of FIG. 1, in accordance with an embodiment of the present invention.

FIG. 2 is a flowchart depicting operations for aggregation of traffic impact metrics, on a computing device within the computing environment of FIG. 1, in accordance with an embodiment of the present invention. For example, FIG. 2 is a flowchart depicting operations 200 of prediction program 104 on computing device 102 within computing environment 100.

In step 202, prediction program 104 associates holidays with holiday categories. In one embodiment, prediction program 104 categorizes each of one or more holidays based on user input received via client UI 112. In this case, an administrator may populate holiday database 106 with holiday data by identifying a category to which each of one or more holidays belongs. The number of categories and the category to which each holiday belongs is determined based on the user input. As used herein, a "number" of one or more items means the count or tally of how many items are in the one or more items. Holiday database 106 stores holiday data for each holiday, including dates of previous occurrences of the holiday and dates of future occurrences of the holiday. As discussed above, holiday database 106 stores holiday data for each holiday of each holiday category. In some embodiments, a holiday category may include a date on which a holiday of the holiday category actually occurs and a date on which the holiday is observed. In this case, prediction program 104 may treat the date on which the holiday is observed as a separate holiday, or prediction program 104 may treat the date on which the holiday is observed as an additional occurrence of the holiday.

In step 204, prediction program 104 associates points of interest with one or more categories. In one embodiment, prediction program 104 categorizes one or more POI based on user input received via client UI 112. In another embodiment, prediction program 104 categorizes one or more POI based on publicly-available or proprietary databases specifying POI details. For example, prediction program 104 categorizes a POI based on a category specified by a business directory that identifies the POI. A POI is associated with one or more links of the transportation network. For example, a POI at the corner of two streets may be associated with links that represent each of the two streets. Each link may be associated with zero or more POI. Each POI may be associated with zero or more links. Each POI may be categorized into zero or more categories.

In step 206, prediction program 104 determines a mean weekday volume for each day of the week. As used herein, weekday refers to a day of the week, including Monday, Tuesday, Wednesday, Thursday, Friday, Saturday, and Sunday. In one embodiment, prediction program 104 determines a mean weekday volume for each weekday based on historic traffic data for one or more previous days corresponding to the same day of the week. For example, prediction program 104 determines a mean weekday volume for Monday based on historic traffic data of one or more previous Mondays. In various embodiments, the mean weekday volume is a measure of traffic volume, traffic speed, or a combination thereof. In some embodiments, the mean weekday volume is based on historic traffic data for days of previous years occurring on the same day of the week and in the same week of the year. For example, the mean weekday volume for a given Saturday in the twenty-eighth week of the year may be based on historic traffic date for one or more Saturdays in the twenty-eight week of previous years.

In step 208, prediction program 104 determines a traffic impact of each holiday. In one embodiment, prediction program 104 determines a traffic impact for a holiday based on historic traffic data corresponding to one or more dates of previous occurrences of the holiday. In one embodiment, prediction program 104 determines a traffic impact of a holiday by averaging the impact of one or more past occurrences of the holiday. In this case, prediction program 104 determines the impact of each past occurrence by subtracting the mean weekday volume for the day of the week on which the past occurrence fell from the traffic volume identified by the historic traffic data for the date of the past occurrence.

In step 210, prediction program 104 determines a mean category impact of each holiday category. The mean category impact of a holiday category is based on the traffic impact of each holiday that belongs to the holiday category. Prediction program 104 determines the mean category impact of a holiday category by averaging the traffic impact of each holiday of the holiday category. For example, a first holiday category includes a plurality of holidays. In this case, the mean category impact for the first holiday category is based on an average of the traffic impact of each of the plurality of holidays.

In step 212, prediction program 104 determines an aggregated traffic impact metric. The aggregated traffic impact metric corresponds to a link of a transportation network. In one embodiment, prediction program 104 determines the aggregated traffic impact metric for a link based on the number of POI corresponding to the link, the holiday category of each POI, and the mean category impact of each holiday category. In one embodiment, the aggregated traffic impact metric of a link is a weighted average of the mean category impact of each holiday category to which POI of the link belong, weighted based on the number of POI along the link belonging to each holiday category. Therefore, the ratio of POI along a link belonging to holiday categories is positively correlated with the traffic volume on the link and negatively correlated with traffic speed on the link.

In one embodiment, prediction program 104 determines the aggregated traffic impact metric for a link utilizing Formula 1.

$$\text{Metric}(L_i) = \sum_{x=1}^{n}\left(\frac{\text{Alpha}(HC_x)}{\text{Theta}} * \text{Mean}(HC_x)\right) \qquad \text{Formula 1}$$

In Formula 1, Metric($L_i$) represents the aggregated traffic impact metric for a given link (i.e., $L_i$). Alpha($HC_x$) represents the number of POI along link L that belong to holiday category x. Theta represents the total number of POI (including POI of any category or no category) along link $L_i$. Mean($HC_x$) represents the mean category impact for holiday category x. Finally, n represents the number of defined holiday categories. Thus, prediction program 104 can utilize Formula 1 to determine an aggregated traffic impact metric for a link, wherein the mean category impact of each of several holiday categories is weighted based on a ratio of the POI along the link that belong to the holiday category to the total number of POI along the link.

In another embodiment, prediction program 104 determines the aggregated traffic impact metric for a link utilizing Formula 2.

$$\text{Metric(Date)} = \qquad\qquad\qquad\qquad\qquad\qquad\qquad \text{Formula 2}$$
$$\text{Mean}(WD) + \sum_{x=1}^{n}\left(\frac{\text{Impact}(HC_x)}{\sum_{i=1}^{n}\text{Impact}(HC_i)} * \text{Impact}(HC_x)\right)$$

In Formula 2, Metric(Date) represents a date on which holidays of multiple categories occur. Mean(WD) represents a mean weekday volume for the day of the week corresponding to the date. Impact($HC_x$) represents the mean category impact of holiday category x. Impact($HC_i$) represents the mean category impact of holiday category i. Finally, n represents the number of defined categories. Thus, prediction program 104 can utilize Formula 2 to determine an aggregated traffic impact metric for a date based on a mean weekday volume and the mean category impact of each holiday category, wherein the mean category impact of each holiday category is weighted proportionally to the mean category impact of each other holiday category.

Figure 3:
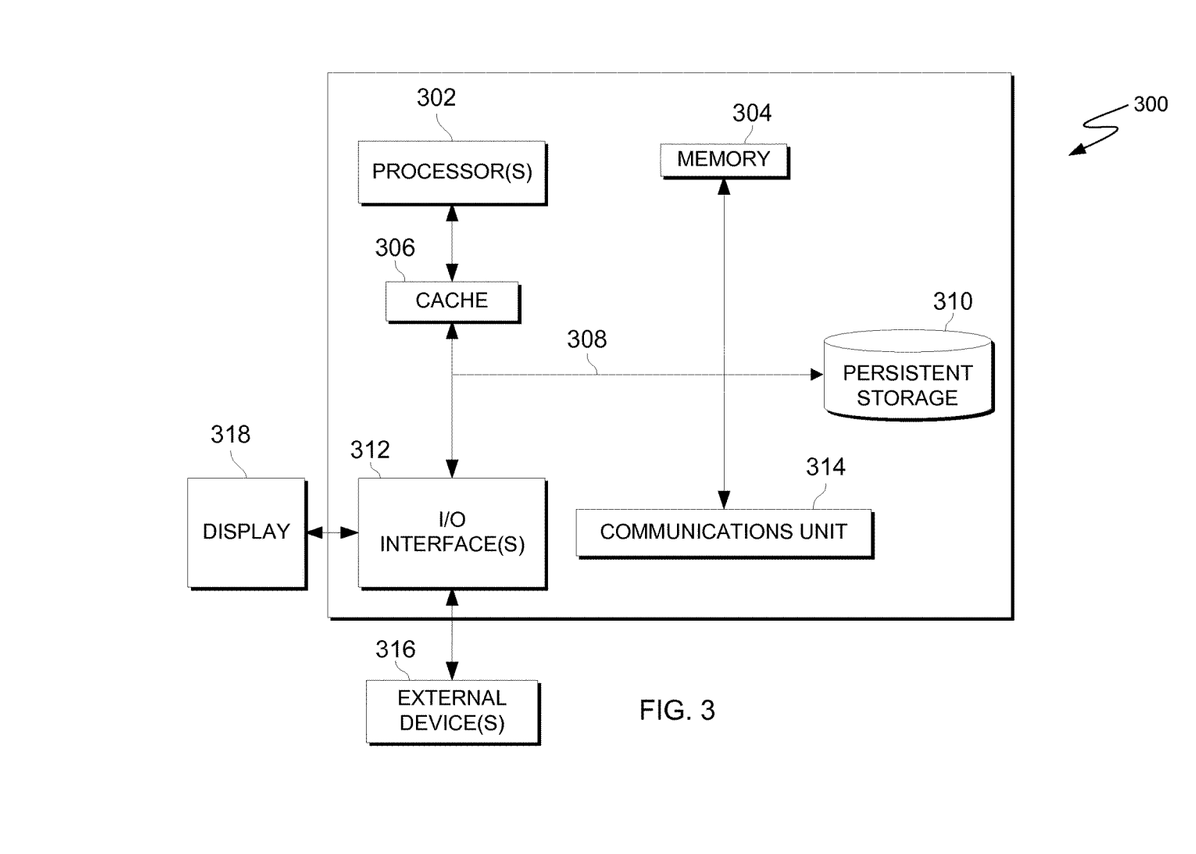
FIG. 3 is a block diagram of components of a computing device executing operations for aggregation of traffic impact metrics, in accordance with an embodiment of the present invention.

FIG. 3 is a block diagram of components of a computing device, generally designated 300, in accordance with an embodiment of the present invention. In one embodiment, computing device 300 is representative of computing device 102 within computing environment 100, in which case computing device 102 includes at least prediction program 104.

It should be appreciated that FIG. 3 provides only an illustration of one implementation and does not imply any limitations with regard to the environments in which different embodiments may be implemented. Many modifications to the depicted environment may be made.

Computer system 300 includes processor(s) 302, cache 306, memory 304, persistent storage 310, input/output (I/O) interface(s) 312, communications unit 314, and communications fabric 308. Communications fabric 308 provides communications between cache 306, memory 304, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses or a crossbar switch.

Memory 304 and persistent storage 310 are computer readable storage media. In this embodiment, memory 304 includes random access memory (RAM). In general, memory 304 can include any suitable volatile or non-volatile computer readable storage media. Cache 306 is a fast memory that enhances the performance of processor(s) 302 by holding recently accessed data, and data near recently accessed data, from memory 304.

Program instructions and data used to practice embodiments of the present invention may be stored in persistent storage 310 and in memory 304 for execution by one or more of the respective processor(s) 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer readable storage medium that is also part of persistent storage 310.

Communications unit 314, in these examples, provides for communications with other data processing systems or devices. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to each computer system. For example, I/O interface(s) 312 may provide a connection to external device(s) 316 such as a keyboard, keypad, a touch screen, and/or some other suitable input device. External device(s) 316 can also include portable computer readable storage media such as, for example, thumb drives, portable optical or magnetic disks, and memory cards. Software and data used to practice embodiments of the present invention can be stored on such portable computer readable storage media and can be loaded onto persistent storage 310 via I/O interface(s) 312. I/O interface(s) 312 also connect to display 318.

Display 318 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a graphical user interface display based on aggregation of traffic impact metrics, the method comprising:
    generating, by one or more processors, a first plurality of database entries in which each of a plurality of holidays are respectively associated with a holiday category of a plurality of holiday categories, wherein the plurality of holiday categories includes a first holiday category and a second holiday category;
    identifying, by one or more processors, a plurality of physical points of interest along a physical link of a transportation network;
    generating, by one or more processors, a second plurality of database entries in which (i) at least one of the plurality of physical points of interest is associated with the first holiday category and (ii) at least one of the plurality of physical points of interest is associated with the second holiday category;
    determining, by one or more processors, a mean category impact for each of the plurality of holiday categories;
    determining, by one or more processors, an aggregated traffic impact metric based, at least in part, on the mean category impact of each of the plurality of holiday categories, wherein the aggregated traffic impact metric corresponds to a date on which a holiday of the first holiday category occurs and on which a holiday of the second holiday category occurs, and wherein the aggregated traffic impact metric is a sum of: (i) a mean weekday volume of the date; and (ii) the mean category impact for each of the plurality of holiday categories, wherein each mean category impact is weighted based, at least in part, on the mean category impact of each other holiday category; and generating, by one or more processors, a graphical user interface display on a computing device, wherein the graphical user interface display includes a traffic prediction for the physical link of the transportation network based, at least in part, on one or more effects that the aggregated traffic impact metric has on (i) a traffic volume on the physical link of the transportation network and (ii) a traffic speed on the physical link of the transportation network, wherein each of the one or more effects are one or both of (i) positively correlated with the traffic volume on the physical link and (ii) negatively correlated with traffic speed on the physical link.

2. The method of claim 1, further comprising:
determining, by one or more processors, a mean weekday volume for each day of a week, wherein the mean weekday volume for each day of the week is based, at least in part, on historic traffic data for one or more previous days corresponding to the day of the week.

3. The method of claim 2, wherein the aggregated traffic impact metric is a function of: (i) the mean category impact for each of the plurality of holiday categories; (ii) a number of points of interest located along the link and associated with each of the plurality of holiday categories; and (iii) a total number of points of interest along the link.

4. The method of claim 3, wherein the mean category impact for each of the plurality of holiday categories is weighted based on a ratio of the number of points of interest along a link that are associated with the holiday category to the total number of points of interest along the link.

5. The method of claim 2, wherein the mean category impact for each of the plurality of holiday categories is based on a traffic impact for each holiday of the holiday category.

6. The method of claim 5, wherein the traffic impact for each holiday is based on historical traffic data of one or more previous occurrences of the holiday and a mean weekday volume for a day of a week of each of the one or more previous occurrences.

7. The method of claim 1, the method further comprising:
determining, by one or more processors, an aggregated traffic impact metric for a given date based on a mean weekday volume and the mean category impact of each holiday category, wherein the mean category impact of each holiday category is weighted proportionally to the mean category impact of each other holiday category.

8. The method of claim 1, the method further comprising:
determining, by one or more processors, an aggregated traffic impact metric for the physical link of the transportation network, wherein the mean category impact of each of a plurality of holiday categories is weighted based on a ratio of (i) a number of points of interest along the link that belong to the holiday category to (ii) the total number of points of interest along the physical link.

9. A computer program product for generating a graphical user interface display based on aggregation of traffic impact metrics, the computer program product comprising:
a computer readable storage medium and program instructions stored on the computer readable storage medium, the program instructions comprising:
program instructions to generate a first plurality of database entries in which each of a plurality of holidays are respectively associated with a holiday category of a plurality of holiday categories, wherein the plurality of holiday categories includes a first holiday category and a second holiday category;
program instructions to identify a plurality of physical points of interest along a physical link of a transportation network;
program instructions to generate a second plurality of database entries in which (i) at least one of the plurality of physical points of interest is associated with the first holiday category and (ii) at least one of the plurality of physical points of interest is associated with the second holiday category;
program instructions to determine a mean category impact for each of the plurality of holiday categories;
program instructions to determine an aggregated traffic impact metric based, at least in part, on the mean category impact of each of the plurality of holiday categories, wherein the aggregated traffic impact metric corresponds to a date on which a holiday of the first holiday category occurs and on which a holiday of the second holiday category occurs, and wherein the aggregated traffic impact metric is a sum of: (i) a mean weekday volume of the date; and (ii) the mean category impact for each of the plurality of holiday categories, wherein each mean category impact is weighted based, at least in part, on the mean category impact of each other holiday category; and
program instructions to generate a graphical user interface display on a computing device, wherein the graphical user interface display includes a traffic prediction for the physical link of the transportation network based, at least in part, on one or more effects that the aggregated traffic impact metric has on (i) a traffic volume on the physical link of the transportation network and (ii) a traffic speed on the physical link of the transportation network, wherein each of the one or more effects are one or both of (i) positively correlated with the traffic volume on the physical link and (ii) negatively correlated with traffic speed on the physical link.

10. The computer program product of claim 9, wherein the program instructions further comprise:
program instructions to determine a mean weekday volume for each day of a week, wherein the mean weekday volume for each day of the week is based, at least in part, on historic traffic data for one or more previous days corresponding to the day of the week.

11. The computer program product of claim 10, wherein the aggregated traffic impact metric is a function of: (i) the mean category impact for each of the plurality of holiday categories; (ii) a number of points of interest located along the link and associated with each of the plurality of holiday categories; and (iii) a total number of points of interest along the link.

12. The computer program product of claim 11, wherein the mean category impact for each of the plurality of holiday categories is weighted based on a ratio of the number of points of interest along a link that are associated with the holiday category to the total number of points of interest along the link.

13. The computer program product of claim 10, wherein the mean category impact for each of the plurality of holiday categories is based on a traffic impact for each holiday of the holiday category.

14. The computer program product of claim 13, wherein the traffic impact for each holiday is based on historical traffic data of one or more previous occurrences of the holiday and a mean weekday volume for a day of a week of each of the one or more previous occurrences.

15. A computer system for aggregation of traffic impact metrics, the computer system comprising:
one or more computer processors;
one or more computer readable storage media;
program instructions stored on the computer readable storage media for execution by at least one of the one or more processors, the program instructions comprising:
program instructions to generate a first plurality of database entries in which each of a plurality of holidays are respectively associated with a holiday category of a plurality of holiday categories, wherein the plurality of holiday categories includes a first holiday category and a second holiday category;
program instructions to identify a plurality of physical points of interest along a physical link of a transportation network;
program instructions to generate a second plurality of database entries in which (i) at least one of the plurality of physical points of interest is associated with the first holiday category and (ii) at least one of the plurality of physical points of interest is associated with the second holiday category;
program instructions to determine a mean category impact for each of the plurality of holiday categories;
program instructions to determine an aggregated traffic impact metric based, at least in part, on the mean category impact of each of the plurality of holiday categories, wherein the aggregated traffic impact metric corresponds to a date on which a holiday of the first holiday category occurs and on which a holiday of the second holiday category occurs, and wherein the aggregated traffic impact metric is a sum of: (i) a mean weekday volume of the date; and (ii) the mean category impact for each of the plurality of holiday categories, wherein each mean category impact is weighted based, at least in part, on the mean category impact of each other holiday category; and
program instructions to generate a graphical user interface display on a computing device, wherein the graphical user interface display includes a traffic prediction for the physical link of the transportation network based, at least in part, on one or more effects that the aggregated traffic impact metric has on (i) a traffic volume on the physical link of the transportation network and (ii) a traffic speed on the physical link of the transportation network, wherein each of the one or more effects are one or both of (i) positively correlated with the traffic volume on the physical link and (ii) negatively correlated with traffic speed on the physical link.

16. The computer system of claim 15, wherein the program instructions further comprise:
program instructions to determine a mean weekday volume for each day of a week, wherein the mean weekday volume for each day of the week is based, at least in part, on historic traffic data for one or more previous days corresponding to the day of the week.

17. The computer system of claim 16, wherein the aggregated traffic impact metric is a function of: (i) the mean category impact for each of the plurality of holiday categories; (ii) a number of points of interest located along the link and associated with each of the plurality of holiday categories; and (iii) a total number of points of interest along the link.

18. The computer system of claim 17, wherein the mean category impact for each of the plurality of holiday categories is weighted based on a ratio of the number of points of interest along a link that are associated with the holiday category to the total number of points of interest along the link.

19. The computer system of claim 16, wherein the mean category impact for each of the plurality of holiday categories is based on a traffic impact for each holiday of the holiday category.

20. The computer system of claim 19, wherein the traffic impact for each holiday is based on historical traffic data of one or more previous occurrences of the holiday and a mean weekday volume for a day of a week of each of the one or more previous occurrences.

* * * * *